(12) United States Patent
Chui et al.

(10) Patent No.: US 7,923,954 B1
(45) Date of Patent: Apr. 12, 2011

(54) VOICE-COIL MOTOR CONTROL WITH ZERO-CURRENT SENSING

(75) Inventors: Siew Yong Chui, Singapore (SG); Jye Sheng Hong, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/572,139

(22) Filed: Oct. 1, 2009

Related U.S. Application Data

(63) Continuation of application No. 11/871,110, filed on Oct. 11, 2007, now Pat. No. 7,622,880.

(60) Provisional application No. 60/829,356, filed on Oct. 13, 2006.

(51) Int. Cl.
*H02P 6/00* (2006.01)
(52) U.S. Cl. .................................. 318/400.32; 318/459
(58) Field of Classification Search .................. 318/599, 318/811, 500, 459, 400.32, 400.34, 400.35; 388/800, 804, 806, 811, 815, 819, 928.1
See application file for complete search history.

(56) References Cited

U.S. PATENT DOCUMENTS

| 5,517,095 | A  | * | 5/1996  | Carobolante et al. .... 318/400.35 |
| 5,615,064 | A  |   | 3/1997  | Blank et al. |
| 5,838,515 | A  | * | 11/1998 | Mortazavi et al. ......... 360/78.12 |
| 6,040,671 | A  |   | 3/2000  | Brito et al. |
| 6,204,629 | B1 | * | 3/2001  | Rote et al. ..................... 318/803 |
| 6,252,362 | B1 | * | 6/2001  | White et al. ............. 318/400.35 |
| 6,560,057 | B1 | * | 5/2003  | Klaassen et al. ................ 360/75 |
| 6,611,118 | B2 |   | 8/2003  | Abe et al. |
| 6,700,344 | B1 | * | 3/2004  | Krishnamoorthy et al. .. 318/461 |
| 6,804,131 | B2 | * | 10/2004 | Galbiati et al. ............... 363/132 |

* cited by examiner

*Primary Examiner* — Rina I Duda

(57) ABSTRACT

A circuit for controlling a voice-coil motor (VCM) may incorporate a pulse-width modulation driver to drive the VCM, a zero-current detector to determine whether the current across the VCM is zero, and a Back-EMF voltage detector to measure the voltage across the VCM when the current across the VCM is determined to be zero. The circuit may determine the current velocity of the VCM and use this information to control the velocity of the VCM.

19 Claims, 4 Drawing Sheets

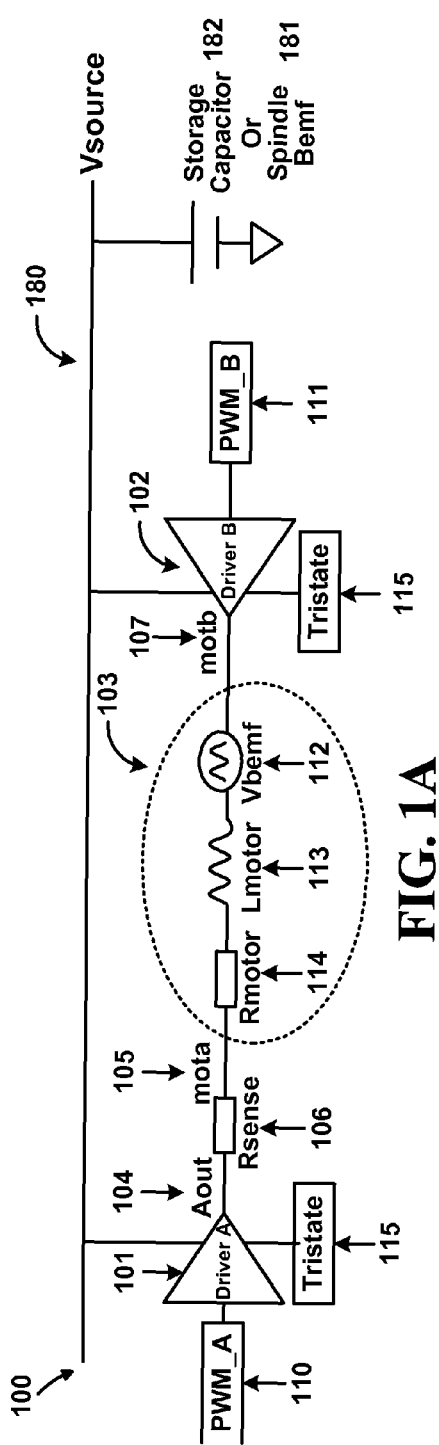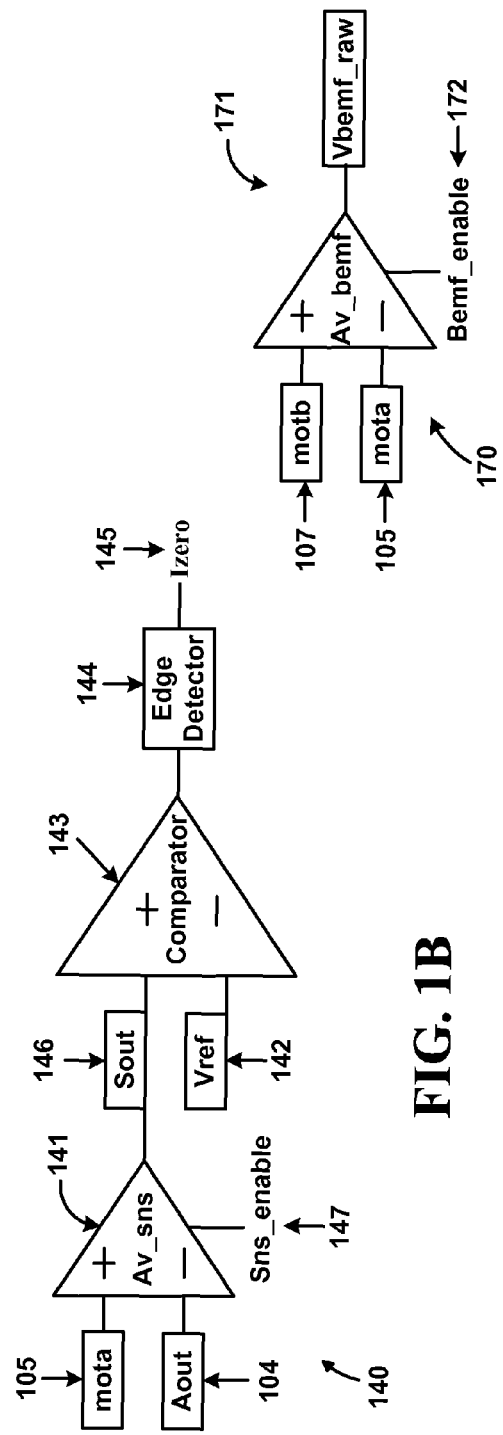

VOICE-COIL MOTOR CONTROL WITH ZERO-CURRENT SENSING

CROSS-REFERENCE TO RELATED APPLICATIONS

This application is a continuation of U.S. application Ser. No. 11/871,110, filed Oct. 11, 2007, which claims the benefit of Provisional Application No. 60/829,356, filed on Oct. 13, 2006. The disclosures of these applications are incorporated herein by reference in their entirety.

FIELD OF THE INVENTION

The present invention relates to a system and method of using pulse-width modulation to control the velocity of a disk drive voice-coil motor during the drive's head loading/unloading sequence.

DESCRIPTION OF THE RELATED ART

A disk drive suspension assembly includes a suspension coupled to an actuator assembly driven by a voice-coil motor. The suspension assembly also includes a read/write head ("head"). When the drive is not performing a read/write operation, the head is retracted to a parking area away from tracks on a disk drive medium to reduce the chance that the head will contact the media. This sequence is known as "unloading" or "parking" and usually occurs during normal power-down of the disk, when the disk drive suddenly loses power, or when the disk drive simply is not being used. For a read/write operation, the head may be moved from the parking area to the media, an operation known as "loading".

To accomplish these movements, a ramp load/unload mechanism may guide the suspension arm and head from the media to the parking area during unload, and from the parking area to the media during load. Velocity control of the voice-coil motor (VCM) (which in turn governs the movement of the head) during the process of parking the head on the ramp during unload, and over the media during load, can prevent the head from dropping on the media and possibly damaging the head and/or the media.

It is desirable to perform loading/unloading at a substantially constant velocity to overcome friction and to traverse the ramp without damaging the head. Over time, the head and ramp-stop may be damaged by contact between the ramp-stop and the head when it is being parked.

The VCM velocity is directly proportional to the back electro-motive force voltage generated by the VCM ($V_{bemf}$). Generally, to arrive at the value of $V_{bemf}$, the following formula can be used:

$$V_m = (I_m \cdot R_m) + L_m \cdot \left(\frac{d I_m}{d t}\right) + V_{bemf} \tag{1}$$

where $V_m$ is the voltage across the VCM. To determine the value of $V_{bemf}$, the voltage due to motor resistance, $R_m$, and the motor induction, $L_m$, need to be eliminated. In linear mode, a constant current can be applied, which will bring the $$L_m \cdot \left(\frac{d I_m}{d t}\right)$$

term to zero. The resistance component, $R_m$, can be cancelled by introducing a ($I_m \cdot R_s \cdot$Gain) term, where $R_s$ is a current sense resistance and the Gain term is calibrated to $$\frac{R_m}{R_s}.$$

Thus, the final equation may be presented as follows:

$$V_m = (I_m \cdot R_m) + L_m \cdot \left(\frac{d I_m}{d t}\right) + V_{bemf} - (I_m \cdot R_s \cdot \text{Gain}) \tag{2}$$

and so, $$V_m = V_{bemf} \text{ when Gain} = \frac{R_m}{R_s} \text{ and } I_m \text{ is constant.} \tag{3}$$

However, such a calculation is not possible when the VCM is being driven by pulse-width modulation because the current is switching and so the time to reach steady-state depends on the physical parameters of the VCM, placing a limitation on the maximum PWM frequency allowed. When the VCM is driven by PWM, the current will reach a peak and then will decay to zero, such decay being dependent on the time constant, $L_m/R_m$, of the VCM. If the frequency of the motor is too high, the current will never fully decay to zero, and thus $V_m$ never really equals $V_{bemf}$.

Thus, it is desirable to sample the $V_{bemf}$, and therefore reliably control the velocity of a VCM, in a system that does not use a constant current, such as a PWM-driven system.

SUMMARY

Embodiments of the present invention overcome the above-mentioned and various other shortcomings of conventional technology, providing a circuit incorporating a pulse-width modulation driver to drive a voice-coil motor (VCM), a zero-current detector to determine whether the current across the VCM is zero, and a Back-EMF voltage detector to measure the voltage across the VCM when the current across the VCM is determined to be zero. In accordance with one aspect of the invention, the circuit determines the current velocity of the VCM and uses this information to control the velocity of the VCM.

BRIEF DESCRIPTION OF THE DRAWINGS

FIGS. 1A-1C are block diagrams showing different elements of one embodiment of the VCM PWM velocity control system according to the present invention.

DETAILED DESCRIPTION

Exemplary embodiments of the present invention control the velocity of a voice-coil motor (VCM) using pulse width modulation (PWM) in accordance with one or more of the following: (1) to reduce the overall power dissipation of the system; (2) to use a zero-current detection method to control the pulse-width of the PWM drivers; (3) to allow for the detection of the VCM's back electromotive force independent of the VCM's resistance variation; and (4) to allow for this velocity control without $R_m/R_s$ calibration.

As shown in FIG. 1, an embodiment of a PWM-driven velocity control mechanism for a VCM may include a PWM driver with motor ("PWM system") 100, a zero-current detector 140, a back-EMF amplifier 170, and an energy source 180. The system also may include one or more elements shown in FIG. 2, such as an Analog to Digital converter with Speed Information Decoder 201 and/or a Digital Controller and PWM Generator ("controller") 210.

Figure 2:
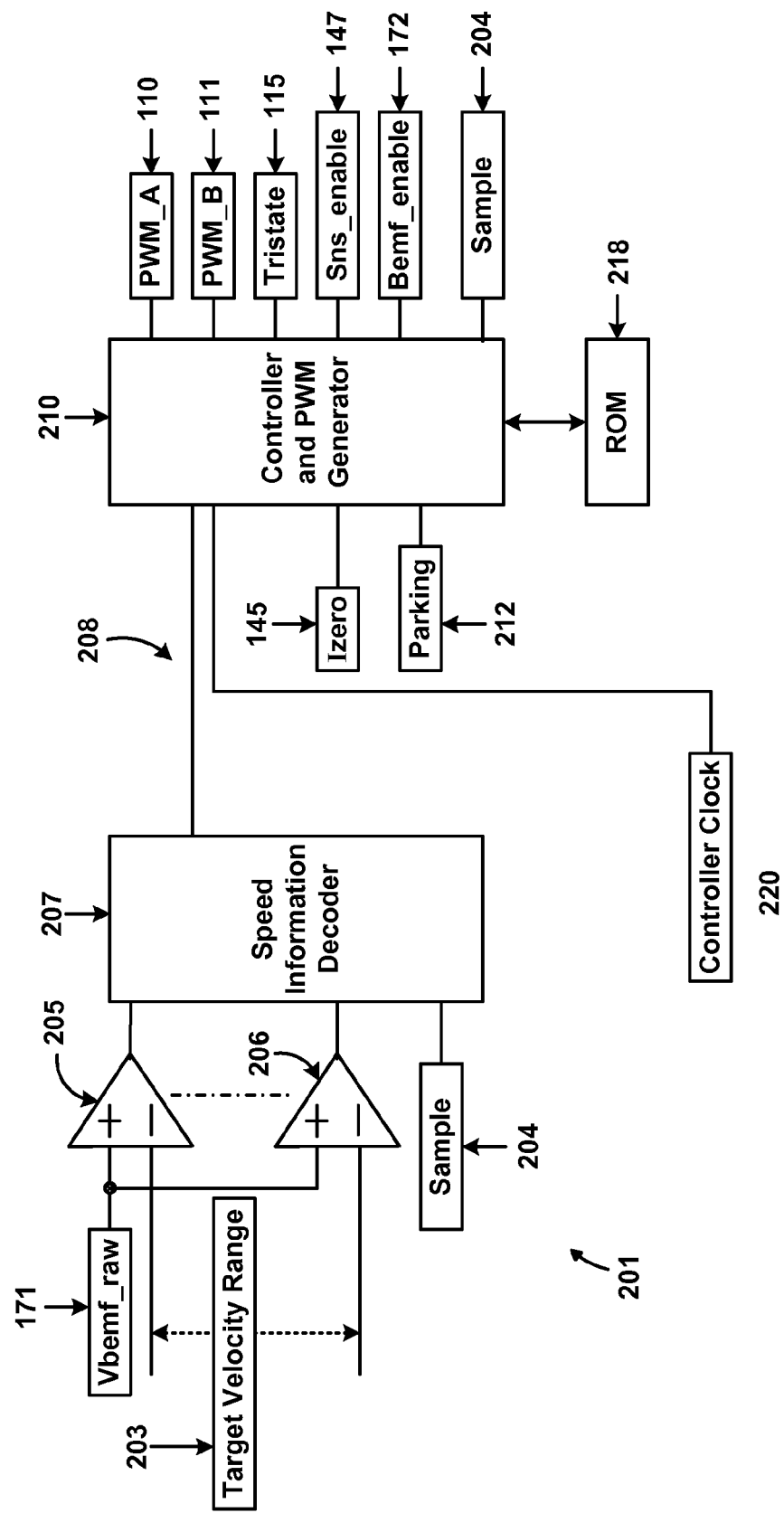
FIG. 2 is a different block diagram of one embodiment of the VCM PWM velocity control system according to the present invention.

The PWM system 100 may include a VCM 103 and two drivers, Driver A 101 and Driver B 102 that may drive the motor in opposite respective directions depending on the PWM_A 110 and PWM_B 111 signals generated by the digital controller 210 shown in FIG. 2. In one embodiment, Driver A 101 may drive the VCM 103 in one direction and Driver B 102 may drive the VCM 103 in an opposite direction. These drivers are powered by an energy source 180, which can be any power source, including a storage capacitor and/or the back-EMF voltage of the disk drive's spindle. The drivers control the direction and speed of the VCM depending on which is being driven by the controller 210 (i.e., Driver A 101 can drive the VCM 103 in one direction and Driver B 102 can drive it in the opposite direction).

The zero current detector 140 determines if the current has decayed to zero after one of the PWM drivers has been charged for the charging period. The charging period may be pre-defined in a ROM 218 which may be part of the controller 210 in FIG. 2. Av_sns amplifier 141 amplifies, level shifts, and converts the current across the sense resistor, $R_{sense}$ 106, to a voltage, with respect to $V_{ref}$ 142. This voltage 146 is then compared to the fixed input, $V_{ref}$ 142, using the voltage comparator 143.

$V_{ref}$ 142 may be pre-defined and can be ground or some other voltage. The voltage comparator 143 outputs to the edge detector 144, which senses changes in signal polarity (i.e., from positive to negative or negative to positive); if a change in polarity is detected it can be said that the current at that point in time is zero, at which point, the $I_{zero}$ signal 145, which is inputted to the controller 210, goes high. Once the controller 210 has been informed by the high $I_{zero}$ 145 signal, it stops driving the PWM driver.

The back-EMF amplifier 170, which includes gain and level-shifting blocks, may amplify the $V_{bemf}$ 112 of the VCM 103 toward a reference value defined by the controller 210. Gain and level-shifting blocks are used here because the $V_{bemf}$ 112 value may be so small as to be indistinguishable from ground. The back-EMF amplifier 170 senses the voltage, $V_m$, across the VCM 103 when the current across the VCM 103 is zero (as in equation 3 above, $V_m=V_{bemf}$ when $I_m$ is zero). Because this voltage value is directly proportional to the velocity of the VCM 103, it can be used to deduce the speed information of the VCM 103 by informing the Speed Information Decoder ("SID") 207 of FIG. 2.

Referring now to FIG. 2, the SID 207 determines from the $V_{bemf\_raw}$ signal 171, the output from the back-EMF amplifier 170, the velocity of the motor by converting the input signals to digital through analog-to-digital converter ("ADC") 201 and outputting speed information 208 to the controller 210. The sampling required by the ADC 201 occurs when the controller 210 sends the Sample signal 204; the actual sampling is done through a plurality of comparators (205, 206 . . . ).

The controller 210 controls the sequence of events and also determines the charge period, which may be pre-stored in ROM 218. The ROM 218 may be used to store the load and unload profiles of the disk drive. These profile values may include the length of the tristate period needed to sample the back-EMF of the VCM 103, the total parking time in the case of an unload operation, the values of the PWM_A 110 and PWM_B 111 signals that correspond to how long the drivers will be charged, regional definitions for $V_{bemf}$ 112, offset calibration, and the gain of the back-EMF amplifier 170. Other profile values may include target speed, and other operational parameters, as will be known to ordinarily skilled artisans. The controller 210 may take as its inputs the speed information 208 from the ADC 201, the zero current signal from the zero current detector 140, $I_{zero}$ 145, and the Parking signal 212, which instructs the system to park suspension arm and head.

Figure 3:
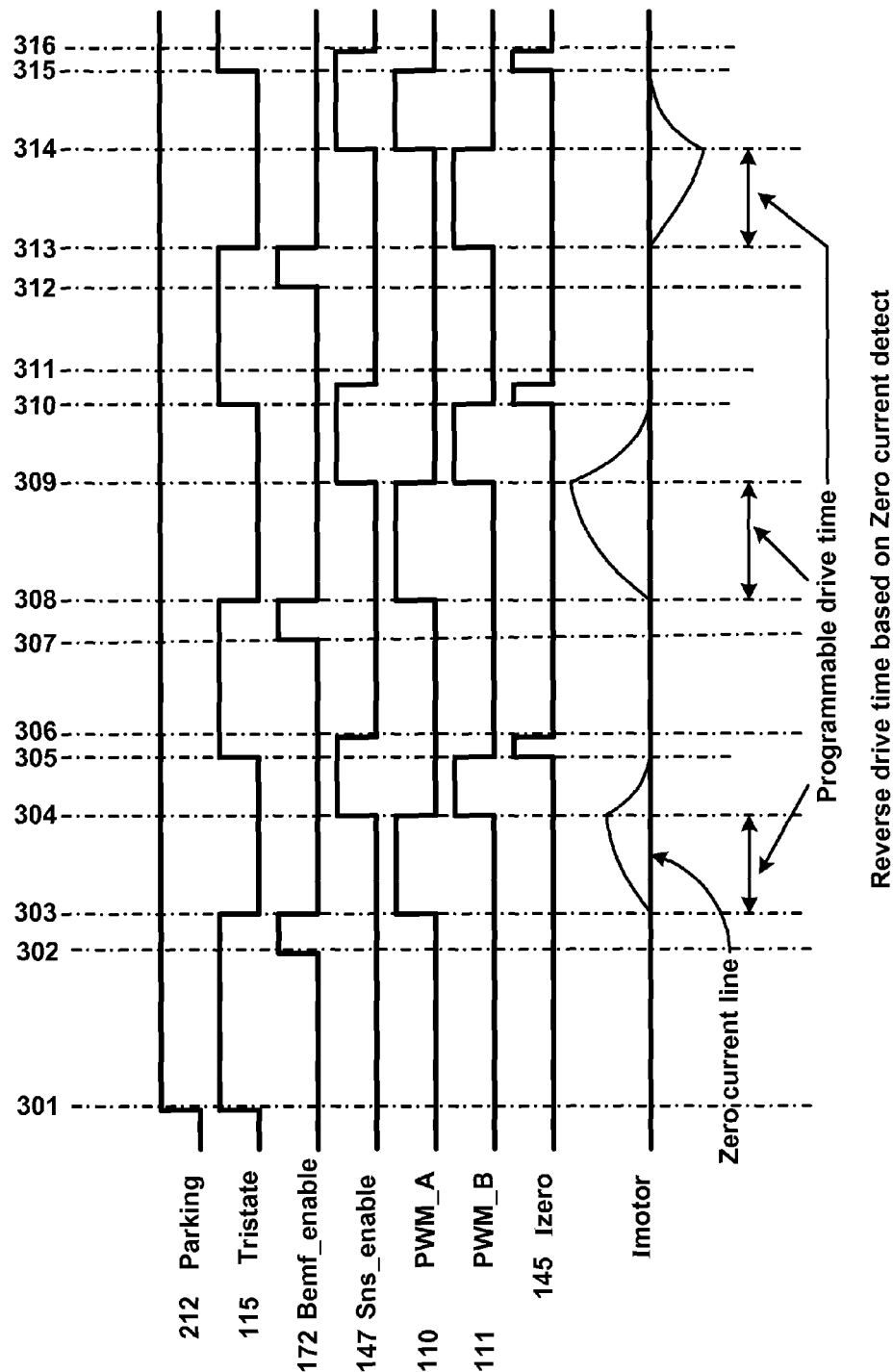
FIG. 3 is a timing diagram illustrating the timing control for a PWM-driven VCM.

FIG. 3 is a timing diagram illustrating the values of the various signals as the system moves the head from the media to the parking area of the ramp—the "unload" sequence. Where helpful, this diagram will be referred to while the flow chart in FIG. 4, which models how the system can work as the head is moved from the media to the parking area of the ramp, is discussed. While only the unload sequence is detailed, those of ordinary skill in the art will appreciate that the invention works just as well to control the velocity of the VCM when moving the head from the parking area of the ramp to the media—the "load" sequence.

Figure 4:
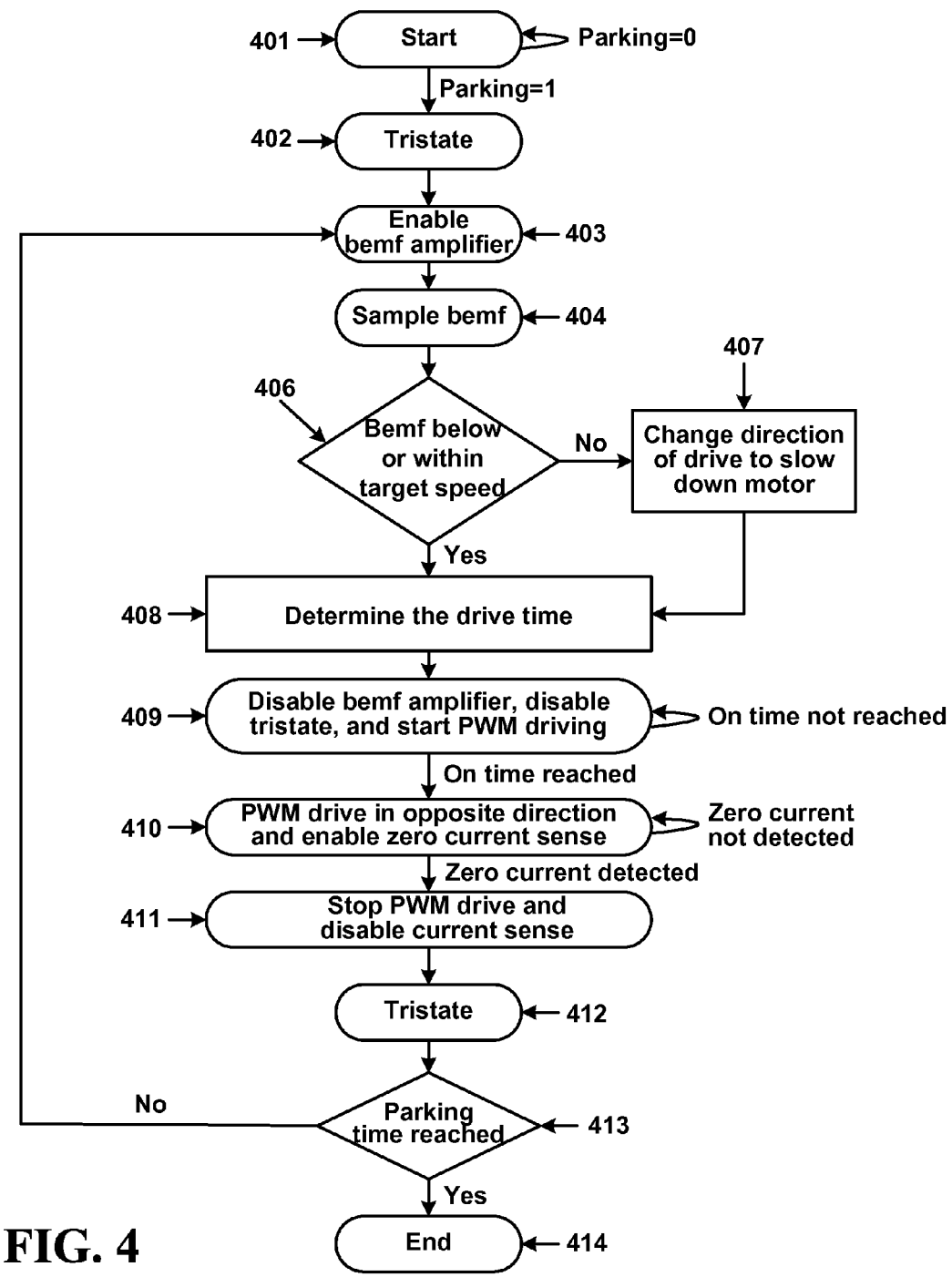
FIG. 4 is a flow chart showing a general head parking operation according to one embodiment of the invention.

At block 401 in FIG. 4, the controller 210 waits for a high parking signal 212 from the disk drive. The length of parking signal 212, which can be pre-defined in ROM 218, corresponds to the length of time it should take the head, moving at the target speed, to traverse the longest distance from the media to the ramp-stop. When the Parking signal 212 goes high (301 in FIG. 3), Driver A 101 and Driver B 102 are tristated in block 402 (time 301 in FIG. 3) for a period long enough to sample $V_{bemf}$ 103. To sample $V_{bemf}$ 103, bemf_enable signal 172 is enabled at block 403 (time 302 in FIG. 3) and then $V_{bemf}$ is sampled at block 404. The controller 210 determines, based on the tristate period, when to make the bemf_enable signal 172 high (i.e., when to enable the back-EMF amplifier 170).

Based on the detected value of $V_{bemf}$ 112, the controller 210 will determine the direction and strength of the VCM 103. At block 406 it is determined whether the sampled $V_{bemf}$ corresponds to a speed below or within the target velocity range 203. If so, the controller 210 may deduce from the speed information 208 that the VCM 103 can continue to move in its current direction and how long the next charge should be. Otherwise, the controller 210 may reverse the direction of the VCM 103 at block 407. The purpose of reversing the VCM's 103 direction is to slow it down and bring it within the target velocity range 203. In one embodiment, controller 210 determines the charging period by accessing a lookup-table in the ROM 218 that contains the value of the charging period needed relative to the sampled speed.

The target velocity range 203 is the desired speed for the VCM 103. In one embodiment, this speed may be measured in inches per second ("IPS") and may be split into regions, which are defined by how far away the sampled speed is from the target velocity range 203. The target speed and regions may be pre-defined in the ROM 218. For example, if the target speed is between 19 and 21 IPS, the regions may be 5-10 IPS, 10-15 IPS, 15-19 IPS, and 21-25 IPS. In this example, if the speed is below 5 IPS (i.e., more than 14 IPS below the target speed of 19-21 IPS), then PWM_A 110 is going to have to be driven longer than if the sampled speed was 15 IPS.

At block 409, after the drive time has been determined in block 408, the controller 210 ends the tristate period and may also disable the back-EMF amplifier 170 by turning bemf_enable 172 low (303, 308, and 313 of FIG. 3). The purpose of turning off the back-EMF amplifier 170 at this point is to save power (i.e., during the next few stages, $V_{bemf}$ does not need to be sampled). When the back-EMF amplifier 170 is functioning, it is draining power from the energy source 180; when the energy source 180 is a storage capacitor, it is desirable to keep it as small as possible because smaller capacitors are cheaper, and take less PCB space.

At substantially the same time that bemf_enable 172 is set low, the controller 210 may set either PWM_A 110 or PWM_B 111 high (303, 308, and 313 of FIG. 3), depending on whether the speed is below, within, or above the target speed, as previously discussed. The PWM signal remains high for as long as the drive time determined at block 408. This "charging" period can be seen in FIG. 3 at 303-304, 308-309, and in the opposite direction (i.e., PWM B 111 at 313-314).

When this drive time expires, the "discharge" period automatically begins at block 410—the controller 210 sets the original PWM signal low and sets the other PWM signal high (304, 309, and 314 of FIG. 3). This discharging period can be seen in the timing diagram at 304-305, 309-310, and in the opposite direction (i.e., when PWM B 110 is charged first) at 314-315. This has the effect of slowing down the VCM 103 as it drives the current back to zero.

Unlike the charging period at block 409, the discharging period—the length of time that the PWM driver is driven in the opposite direction—depends on the time it takes the current across the VCM 203 to decay to zero. To determine when this zero current occurs, the zero current detector 140 may be used. The zero current detector 140 is enabled at block 410 by the controller 210, which generates a high Sns_enable signal 147 (304, 309, and 314 of FIG. 3).

The zero current detector 140 looks for an edge (i.e., a change in polarity) by measuring the voltage across $R_{sense}$ 106 and comparing it with $V_{ref}$ 142, where $V_{ref}$ 142 can be ground or some other voltage as defined by the user.

Once a zero current is detected, the $I_{zero}$ 145 signal goes high to inform the controller 210 (305, 310, and 315 of FIG. 3). Given this information, the controller 210 stops discharging the PWM driver at block 411 (305, 310, and 315 of FIG. 3). Nearly contemporaneously, the controller 210 may disable the zero current detector 140 by turning the Sns_enable signal 147 low (306, 311, and 316 of FIG. 3). As with the back-EMF amplifier 170 above, the purpose of turning the zero current detector 140 off at this point is to save power.

At block 412, Driver A 101 and Driver B 102 are tristated so that $V_{bemf}$ 112 can be sampled again. However, before $V_{bemf}$ is sampled, block 413 checks to see if the parking time has been reached (i.e., the operation is complete and the head has been parked). If the Parking signal 212 is low, then the parking time has expired and the operation ends. If the Parking signal 212 is still high, then the controller 210 returns to block 403 and repeats the entire process.

While the invention has been described in detail above with reference to some embodiments, variations within the scope and spirit of the invention will be apparent to those of ordinary skill in the art. Thus, the invention should be considered as limited only by the scope of the appended claims, and not by the described embodiments.

What is claimed is:

1. A circuit for controlling a voice-coil motor, said circuit comprising:
   at least one pulse-width modulation driver to drive said voice-coil motor;
   a zero current detector to detect whether a current across said voice-coil motor is zero, wherein said zero current detector comprises a comparator to compare a first voltage based on the current across the voice-coil motor to a reference voltage; and
   a Back-EMF voltage detector to measure a second voltage across said voice-coil motor in response to a detection of zero current by said zero current detector.

2. The circuit of claim 1, wherein said comparator output changes state when current across said voice-coil motor is zero.

3. The circuit of claim 1, wherein said zero current detector is enabled while said current across said voice-coil motor is substantially zero.

4. The circuit of claim 3, wherein said Back-EMF voltage detector is enabled for a predetermined time when said current across said voice-coil motor is zero.

5. The circuit of claim 1, wherein said Back-EMF voltage detector comprises an amplifier to amplify and level-shift the second voltage.

6. The circuit of claim 5, further comprising a speed information decoder coupled to at least one input related to the amplified and level-shifted second voltage, to determine a velocity of said voice-coil motor.

7. The circuit of claim 6, further comprising a controller coupled to an output of said speed information decoder, to provide pulse-width modulation signals to drive said at least one pulse-width modulation driver.

8. A method of controlling a voice-coil motor, said method comprising:
   pulse-width modulation driving a voice-coil motor;
   comparing a first voltage based on the current across the voice-coil motor to a reference voltage;
   responsive to said comparing, detecting whether the current across said voice-coil motor is zero; and
   responsive to said detecting, measuring a Back-EMF voltage across said voice-coil motor.

9. The method of claim 8, wherein a result of said comparing changes state when said current across said voice-coil motor is zero.

10. The method of claim 8, further comprising:
    amplifying and level-shifting the Back-EMF voltage across said voice-coil motor.

11. The method of claim 10, further comprising determining a velocity of said voice-coil motor responsive to at least one input related to the amplified and level-shifted Back-EMF voltage of said voice-coil motor.

12. The method of claim 11, further providing pulse-width modulation signals to drive said at least one pulse-width modulation driver responsive to said velocity.

13. A circuit for controlling a voice-coil motor, said circuit comprising:
    means for pulse-width modulation driving a voice-coil motor;
    means for comparing a first voltage based on the current across the voice-coil motor to a reference voltage;
    means for detecting whether a current across said voice-coil motor is zero, wherein said detecting means is coupled to an output of said comparing means; and means for measuring a second voltage across said voice-coil motor in response to a detection of zero current by said detecting means.

14. The circuit of claim 13, wherein said output of said comparing means changes state when said current across said voice-coil motor is zero.

15. The circuit of claim 13, wherein said detecting means is enabled while said current across said voice-coil motor is substantially zero.

16. The circuit of claim 15 wherein said measuring means is enabled for a predetermined time when said current across said voice-coil motor is zero.

17. The circuit of claim 13, wherein said measuring means comprises modifying means for amplifying and level-shifting the second voltage.

18. The circuit of claim 17, further comprising means for determining a velocity of said voice-coil motor coupled to at least one input related to the amplified and level-shifted second voltage.

19. The circuit of claim 18, further comprising means coupled to an output of said determining means for pulse-width modulation driving said driving means.

* * * * *